US008887269B2

(12) United States Patent
Teglia

(10) Patent No.: US 8,887,269 B2
(45) Date of Patent: Nov. 11, 2014

(54) METHOD AND DEVICE FOR AUTHENTICATING A USER WITH THE AID OF BIOMETRIC DATA

(75) Inventor: Yannick Teglia, Belcodène (FR)

(73) Assignee: STMicroelectronics (Rousset) SAS, Rousset (FR)

( * ) Notice: Subject to any disclaimer, the term of this patent is extended or adjusted under 35 U.S.C. 154(b) by 228 days.

(21) Appl. No.: 13/091,332

(22) Filed: Apr. 21, 2011

(65) Prior Publication Data

US 2011/0265178 A1 Oct. 27, 2011

(30) Foreign Application Priority Data

Apr. 22, 2010 (FR) ...................................... 10-53059

(51) Int. Cl.
*G06F 21/00* (2013.01)
*G06F 21/34* (2013.01)
*G06F 21/32* (2013.01)

(52) U.S. Cl.
CPC ................ *G06F 21/34* (2013.01); *G06F 21/32* (2013.01)
USPC .................... 726/19; 726/5; 726/23; 713/168; 713/186; 380/227

(58) Field of Classification Search
USPC .......................................................... 726/19
See application file for complete search history.

(56) References Cited

U.S. PATENT DOCUMENTS

| | | | | |
|---|---|---|---|---|
| 3,808,550 A | * | 4/1974 | Ashkin | 372/97 |
| 5,802,200 A | * | 9/1998 | Wirtz | 382/119 |
| 5,995,026 A | * | 11/1999 | Sellers | 341/34 |
| 6,278,445 B1 | * | 8/2001 | Tanaka et al. | 345/178 |
| 2002/0060665 A1 | * | 5/2002 | Sekiguchi et al. | 345/157 |
| 2006/0214913 A1 | * | 9/2006 | Pedrazzini et al. | 345/163 |
| 2007/0199054 A1 | * | 8/2007 | Florencio et al. | 726/5 |
| 2008/0072065 A1 | * | 3/2008 | Bonalle et al. | 713/186 |
| 2011/0260829 A1 | * | 10/2011 | Lee | 340/5.51 |

FOREIGN PATENT DOCUMENTS

| | | |
|---|---|---|
| EP | 1 469 372 A2 | 10/2004 |
| WO | WO 03/032551 A1 | 4/2003 |

OTHER PUBLICATIONS

République Française Institut National De La Propriété Industrielle, Rapport De Recherche Préliminaire (Preliminary Search Report); issued in French Patent Application No. 10-53059 on Dec. 9, 2010 (2 pages).

* cited by examiner

*Primary Examiner* — Morshed Mehedi
(74) *Attorney, Agent, or Firm* — Slater & Matsil, L.L.P.

(57) ABSTRACT

Authentication system comprising an input device comprising a plurality of input elements configured for inputting respectively characters in response to an input of a sequence of at least one character carried out by a user, the input device comprising at least one determination means coupled to at least one input element in order to determine a force exerted on the said at least one input element, the system comprising a recording means for recording a series of at least one force exerted on the said at least one input element, a memory configured for storing a series of at least one reference force, and comparison means configured for comparing the series of at least one exerted force with the series of at least one reference force.

28 Claims, 3 Drawing Sheets

METHOD AND DEVICE FOR AUTHENTICATING A USER WITH THE AID OF BIOMETRIC DATA

This application claims the priority benefit of French Patent Application No. 10-53059, filed on Apr. 22, 2010, entitled "Method and Device for Authenticating a User With the Aid of Biometric Data," which application is hereby incorporated herein by reference.

TECHNICAL FIELD

The invention relates to the authentication of an individual, and in particular a biometric authentication system.

BACKGROUND

Usually individuals are identified by authentication with the aid of a password. In particular, an individual is identified when he wishes to gain access to confidential data in order to ensure the security of such data. The passwords thus used form part of the knowledge of the user.

It is also possible to improve the security of access to these data by using a medium external to the user, for example a microprocessor card, notably a bank card, on which the password of the user is stored and which makes it possible to verify what the user knows. In this case, the user knows his password, he enters it on a numeric keypad, for example a keypad of a computer terminal, and the microprocessor card makes it possible to compare the sequence input by the user with the encrypted password that is stored on the microprocessor card.

The drawback of passwords is that they can be stolen, or a person can take the place of the person who holds the password. Moreover, the external medium which stores the encrypted password of the user is no longer sufficient to ensure access to the confidential data of the user, since the password may also be stolen and be used fraudulently.

Another drawback is that another person can take the place of the user by knowing the password and by having, fraudulently or not, the microprocessor card of the user. This drawback arises directly from the fact that the password is not intrinsically linked to the individual, since several people can be authenticated with a single password.

In order to improve known authentication systems, biometric systems are currently used. The biometric data are data intrinsic to the individual and can solve some of these problems.

There is currently retinal recognition or fingerprint recognition. However, these devices are complex and require highly-developed processing algorithms in order to process the considerable mass of data that a retina or a fingerprint can provide.

Moreover, fingerprints can be reproduced. Another drawback of fingerprint recognition is that the end of the finger can be covered with a thin layer of deposit, such as a layer of grease which can disrupt the measurement systems.

Another drawback of the current biometric systems is that it would be possible to force a person to place his retina, or his fingers, in front of the authentication systems and thus force access to the data of the user.

It is therefore proposed, in particular, to provide a means for identifying an individual that is less complex than those cited above and that could improve the security of access to the data of the user.

SUMMARY OF THE INVENTION

According to one aspect, an authentication method is proposed, comprising a determination of a sequence of at least one character entered by a user on a character-inputting device, a determination of a sequence of at least one reference character and a comparison of the input sequence with the reference sequence.

According to this aspect, the determination of the input sequence comprises a determination of a series of at least one force exerted on the input device when the sequence is input, the determination of the reference sequence comprises a determination of a series of at least one reference force associated with the user, and the said comparison of the sequences comprises a comparison of the series of at least one force exerted on the input device with the series of at least one reference force.

Thus, a method for authenticating an individual is provided based on biometric data such as the body movements of the individual. Specifically, each person has their own way of entering a password on an input device, give or take an error tolerance. The detection of the forces exerted on the input device therefore makes it possible to identify the person effectively, while being less complex to apply when compared with the current biometric methods. Moreover, taking account of the body movements of an individual can improve the recognition of an individual when compared with the systems that use fingerprint or retinal data. In particular, a user placed in a stressful situation (because he is for example forced by another person to enter his password) will not produce the same forces on the input device as if the user were in a normal situation. Moreover, it is very difficult, or even virtually impossible, for a third person to reproduce the body movements of an individual.

It is also difficult to imitate the intrinsic characteristics of the body movements of an individual, such as the forces exerted by the individual, unlike his fingerprints, for example.

This method is therefore simpler than those that consist in detecting a retinal print or fingerprint, and makes it possible to reinforce the identification of the individual because an individual in a stressful situation will naturally have the same retina and the same fingerprint.

According to one embodiment, the determination of the input sequence comprises a determination of a series of several forces exerted successively on the input device, the determination of the reference sequence comprises the determination of a succession of several reference forces associated with the user and the said comparison of sequences comprises a comparison of the said series of forces exerted on the input device with the said succession of reference forces.

According to another embodiment, the determination of the said series of forces exerted on the input device comprises, for each force exerted on the input device, determining a plurality of forces exerted on respectively several directional axes, for example three directional axes, each force exerted on one directional axe corresponding to a component of the force exerted on the input device, and the reference sequence comprises a series of several reference forces associated with these directional axes.

Therefore, an improved means for determining the forces exerted by the user on the input device is provided. Specifically, even if only one measurement axis is sufficient, it will be possible to use the components of the force exerted on the device on three different axes so as to clarify the comparison of the force exerted by the user and the reference force.

Advantageously, the determination of the force or forces exerted on the input device, and the reference force or forces comprise at least one acceleration measurement with at least one electromechanical microsystem of the accelerometer type coupled with the input device.

Advantageously, each determination of one force exerted on one directional axe, and each determination of one reference force associated with said one directional axe, comprises one acceleration measurement on said one directional axe with at least one electromechanical microsystem of the accelerometer type coupled with the input device.

It is possible to use the MEMS (Microelectromechanical System) technologies, because they are widely accessible on the market. Moreover, their cost is low. Moreover, MEMSs can characterize a movement on the three directional axes. More particularly, MEMSs of the accelerometer type are of a suitable size for a conventional computer keypad.

According to another embodiment, the determination of the input sequence also comprises a determination of a series of at least one input character identifier, the reference sequence also comprises a series of at least one reference character identifier, and the comparison of sequences also comprises a comparison of the series of at least one input character identifier with the series of at least one reference character identifier.

Thus, it is possible to provide a method that uses an authentication of an individual by the body movements of the individual and by the use of a password identification comprising a series of character identifiers. Security of access to the data is thus reinforced.

According to yet another embodiment, the determination of the input sequence also comprises a determination of a series of at least one time gap between two successive forces exerted on the input device, the reference sequence also comprises a series of at least one reference time gap associated with the user, and the comparison of sequences also comprises a comparison of the series of at least one time gap between two successive forces exerted on the input device with the series of at least one reference time gap.

Taking account of a time gap, also called "input speed", makes it possible to reinforce the authentication of the body movements of an individual. Thus it is possible to measure the input force and the input speed which are both intrinsic characteristics of the body movements of an individual.

The determination of the reference sequence may comprise a learning phase comprising several inputs of the said reference sequence on the said input device and a determination of the said reference forces on the basis of these successive inputs. According to yet another embodiment, the learning phase comprises a generation of nominal values of one or more reference forces, and of tolerance values relative to these nominal values.

According to another aspect, an authentication system is proposed comprising an input device comprising a plurality of input elements configured for inputting respectively characters in response to an input of a sequence of at least one character carried out by a user.

The input device comprises at least one determination means coupled to at least one input element in order to determine a force exerted on the said at least one input element, the system comprising a recording means for recording a series of at least one force exerted on the said at least one input element, a memory configured for storing a series of at least one reference force, and comparison means configured for comparing the series of at least one exerted force with the series of at least one reference force.

According to one embodiment, the input device comprises several determination means coupled respectively to several input elements, in order to determine a force exerted on each input element, the memory is configured for storing a series of several reference forces and the comparison means are configured for comparing the series of exerted forces with the series of several reference forces.

According to another embodiment, the input device comprises several determination means coupled respectively to several input elements, each determination means being configured for determining several forces exerted on respectively several directional axes, each force exerted on one directional axe corresponding to a component of the force exerted on the input element coupled to the determination means, the memory is configured for storing a series of several reference forces associated with these directional axes, and the comparison means is configured for comparing the series of forces exerted on each of the ones of the plurality of input elements with the series of a plurality of reference forces.

According to another embodiment, each determination means is configured for determining each force exerted on one directional axe, and each reference force associated with said one directional axe, from one acceleration measurement on said one directional axe.

For example, the input elements are respectively keys of a keypad.

Advantageously, at least one determination means is an electromechanical microsystem of the accelerometer type.

According to one embodiment, the recording means is also configured for recording a series of at least one input character identifier, the memory is configured also for storing a series of at least one reference character identifier, and the comparison means are also configured for comparing the series of at least one input character identifier with the series of at least one reference character identifier.

According to yet another embodiment, the recording means is also configured for recording a series of at least one time gap between two successive forces exerted on the input elements, the memory is configured for also storing a series of at least one reference time gap and the comparison means are also configured for comparing the series of at least one recorded time gap with the series of at least one reference time gap.

BRIEF DESCRIPTION OF THE DRAWINGS

Other advantages and features will appear on examination of the detailed description of embodiments and applications of the invention which are wholly non-limiting and of the appended drawings in which.

DETAILED DESCRIPTION OF ILLUSTRATIVE EMBODIMENTS

Figure 1:
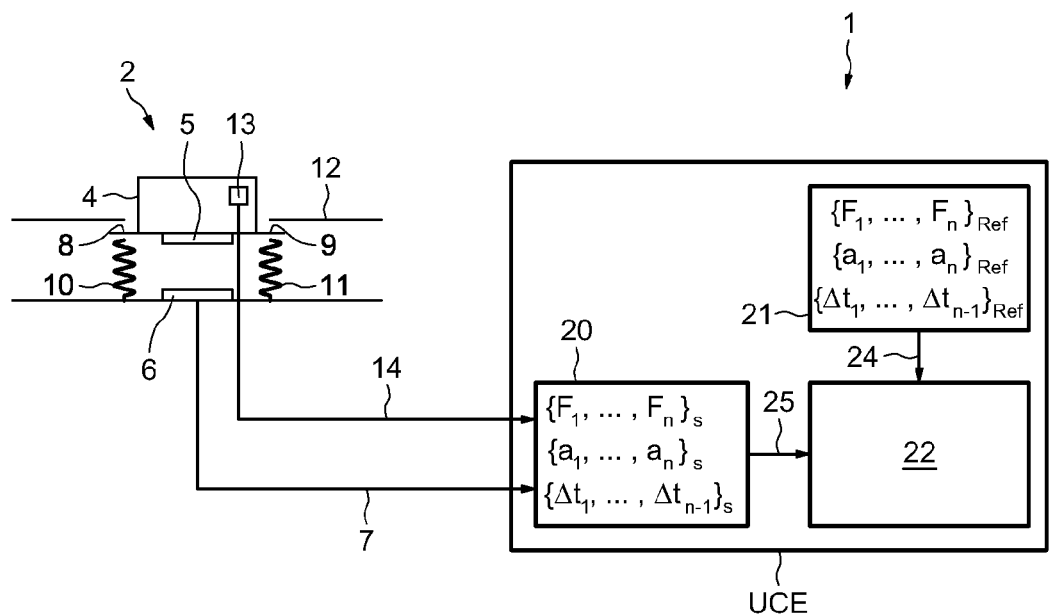
FIG. 1 illustrates schematically an embodiment of an authentication system.

FIG. 1 shows an authentication system 1 comprising an input device 2 and an electronic control unit ECU, such as a processor and its associated memories, for example. The input device 2 may be any type of keypad comprising a set of keys 4. Preferably, the input device 2 is a computer keypad.

The input device 2 comprises a plurality of input elements 4. When the input device 2 is a computer keypad, the input elements 4 are the keys of the said keypad. Shown in FIG. 1 is a view in section of a key 4 of a computer keypad 2. This key 4 is associated with a character marked by an identifier, for example {A, Z, E, R, . . . , N}. This key 4 comprises a first contact zone 5 on its lower face designed to come into contact with a second contact zone 6 of the keypad 2. When the user enters a character with the aid of this key 4, the user presses the key 4 down and the two zones of contact 5, 6 form an electric contact in order to produce the character of the key 4. The electric signal representative of the key that is pushed down is then for example transmitted to the microcontroller of the keypad 2 which sends the identifier (BCD, ASCII or Unicode code) of this character to the ECU, via a connection 7. Moreover, the key 4 comprises abutment elements 8, 9 which prevent the key 4 from coming out of the keypad 2. Moreover, the key 4 is mounted movably on springs 10, 11 which push the key 4 back towards the top portion 12 of the keypad 2. In the illustrated position, the key 4 is not pushed down and the abutment elements 8, 9 are in contact with the top portion 12 of the keypad 2. Thus, when the user pushes the key 4 down, the springs 10 and 11 are compressed and the zones of contact 5 and 6 form the electric contact. Moreover, when the key 4 is pushed down it can move, notably because of manufacturing clearances, on three directional axes.

Moreover, the key 4 comprises an electromechanical microsystem 13 of the accelerometer type, commonly called a MEMS component of accelerometer type. This MEMS component 13 of the accelerometer type is a conventional component available commercially. It is possible, for example, to use the component marketed by STMicroelectronics under reference ST LIS3LV02DL, which is an MEMS inertia sensor of the accelerometer type making it possible to detect an acceleration on three directional axes, and therefore a force on the three directional axes.

A MEMS component 13 of the accelerometer type, that can characterize a movement on three directional axes, can measure three accelerations on respectively these three directional axes. Such MEMS component can determine three forces exerted respectively on these three directional axes. Thus, the forces exerted on these three directional axes correspond respectively to the components of the force exerted on one key 4 of the keypad 2.

In other words, each MEMS component 13 is configured for determining several forces on respectively several directional axes, each determined force corresponding to a component of the force exerted on the key 4 coupled to the MEMS component.

This MEMS component 13 of the accelerometer type is coupled to the ECU by means of a connection 14 in order to transmit the detected-force information to the ECU. Several or all of the keys 4 can be fitted with an MEMS component 13 of the accelerometer type, in particular the keys 4 that will be used to enter a password. This component may for example be bonded to the lower face of the corresponding key 4.

The ECU comprises a recording means 20, a memory 21 and comparison means 22. The recording means 20 and comparison means 22 may for example be software modules within a microprocessor of the ECU.

The recording means 20 is coupled to the second zone of contact 6 of the input element 2 via the connection 7. The recording means 20 is therefore configured to record a series of character identifiers $\{a1, \ldots, an\}$s which has been entered by the user.

The recording means 20 is also coupled to the respective MEMS component 13 of the accelerometer type of the respective key 4 via the connection 14. The recording means 20 is therefore configured to record the series of forces $\{F1, \ldots, Fn\}$s exerted on the keys 4 of the keypad 2 when the characters are input. This series of exerted forces is associated with the series of character identifiers $\{a1, \ldots, an\}$s described above.

Moreover, the set of forces exerted $\{F1, \ldots, Fn\}$s can comprise, either several forces exerted successively on the keys 4 of the keypad 2 when each MEMS component is configured for determining a force exerted on an associated key 4 and on one directional axe, either a succession of several forces exerted on respectively several directional axes, for example three directional axes, when each MEMS component is configured for determining several forces exerted on respectively said several directional axes.

According to an embodiment, a force can be measured when a key 4 of the keypad 2 is pushed, and so it is possible to associate a force to a character identifier. According to another embodiment, several forces can be measured on respectively several directional axes, for example three forces on respectively three directional axes, for each pushed key 4 of the keypad 2. In this other embodiment, several forces, for example three forces, are associated to each character identifier.

The recording means 20 is also configured to record the series of forces exerted on several directional axes, for example three directional axes.

In case where a force exerted is measured for each pushed key 4, and where several forces are measured, for example three forces, for each pushed key 4, each force exerted on one directional axe can be compared with a reference force associated with the said directional axe.

Moreover, the recording means 20 is configured to compute the time gaps $\Delta ti$ recorded between two successive forces exerted on the keys 4 of the keypad 2. This gives a series of time gaps $\{\Delta t1, \ldots, \Delta tn-1\}$s associated with the series of character identifiers $\{a1, \ldots, an\}$s.

The memory 21 is configured to store various reference series, such as for example a series of reference character identifiers $\{a1, \ldots, an\}$ref, a series of reference exerted forces $\{F1, \ldots, Fn\}$ref and a series of reference time gaps $\{\Delta t1, \ldots, \Delta tn-1\}$ref. The memory 21 is coupled to the comparison means 22 via a transmission path 24 so as to transmit to the latter the reference series stored in memory. The comparison means 22 is also coupled to the recording means 20 via a connection 25 in order to receive the various series recorded by the said recording means 20.

Moreover, the comparison means 22 is configured to compare respectively the series recorded by the recording means 20 during the inputting by the user with the reference series stored in the memory 21 in order to authenticate or not authenticate the user.

Specifically, in one very sophisticated embodiment, the user inputs a sequence of characters, such as a password, then the recording means 20 records the series of forces exerted $\{F1, \ldots, Fn\}$s on the respective keys 4 used during inputting, and records the series of character identifiers $\{a1, \ldots, an\}$s associated with the input sequence. Moreover, the recording means 20 computes the series of time gaps $\{\Delta t1, \ldots, \Delta tn-1\}$s between two successive forces of the recorded series of exerted forces $\{F1, \ldots, Fn\}$s. Then, the recording means 20 records this series of time gaps $\{\Delta t1, \ldots, \Delta tn-1\}$s for the purpose of comparing it with a reference series. In order to authenticate the individual who has input the character sequence, the comparison means 22 compares respectively the recorded series $\{F1, \ldots, Fn\}$s, $\{a1, \ldots, an\}$s and $\{\Delta t1, \ldots, \Delta tn-1\}$s with the reference series $\{a1, \ldots, an\}$ref, $\{F1, \ldots, Fn\}$ref and $\{\Delta t1, \ldots, \Delta tn-1\}$ref stored in the memory 21. If the comparisons are correct, i.e., within an acceptable range, the authentication of the individual is correct and otherwise it is incorrect.

Naturally, the authentication could be carried out only with the aid of the measured forces, or else through a combination of these forces with the character identifiers and/or the input speeds.

Figure 2:
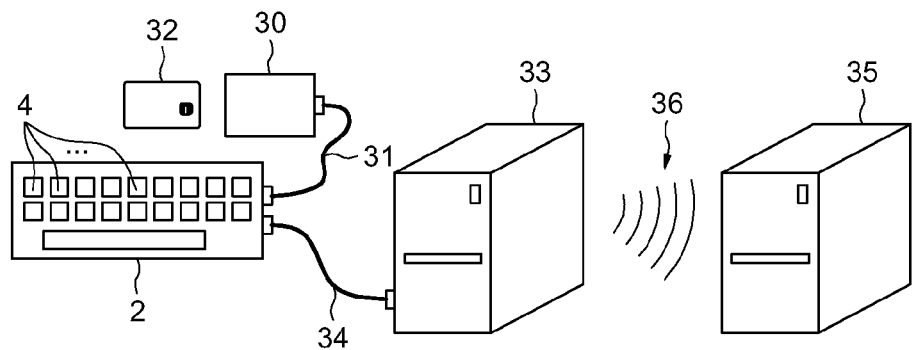
FIG. 2 illustrates schematically another embodiment of an authentication system.

FIG. 2 shows another embodiment of the authentication system 1. The authentication system 1 comprises a computer keypad 2 comprising various input elements 4 corresponding to the keys of the keypad. This keypad 2 is also connected to a drive 30 for reading a microprocessor card 32 via a connection 31. This drive 30 receives the microprocessor card 32 which comprises an authentication code, that is to say a password which may or may not be encrypted. Moreover, the keypad 2 is coupled to a computer 33 via a connection 34. Moreover, the computer 33 may also be connected to a server 35 via a connection 36 which may be an optical, electric, or radio or wireless connection. Preferably, the ECU described above is stored in the computer 33 but other configurations may be envisaged.

The reference series may be stored in the various members of the authentication system 1. For example, the memory 21 may be situated in the computer 33, in the microprocessor card 32, in the server 35 or in the keypad 2.

Moreover, the comparison means 20, which makes it possible to validate the authentication of the individual, may also be situated in one of the members of the authentication system 1. Thus, it is possible to separate the unit that validates the authentication from the means that store the reference series.

Figure 3A:
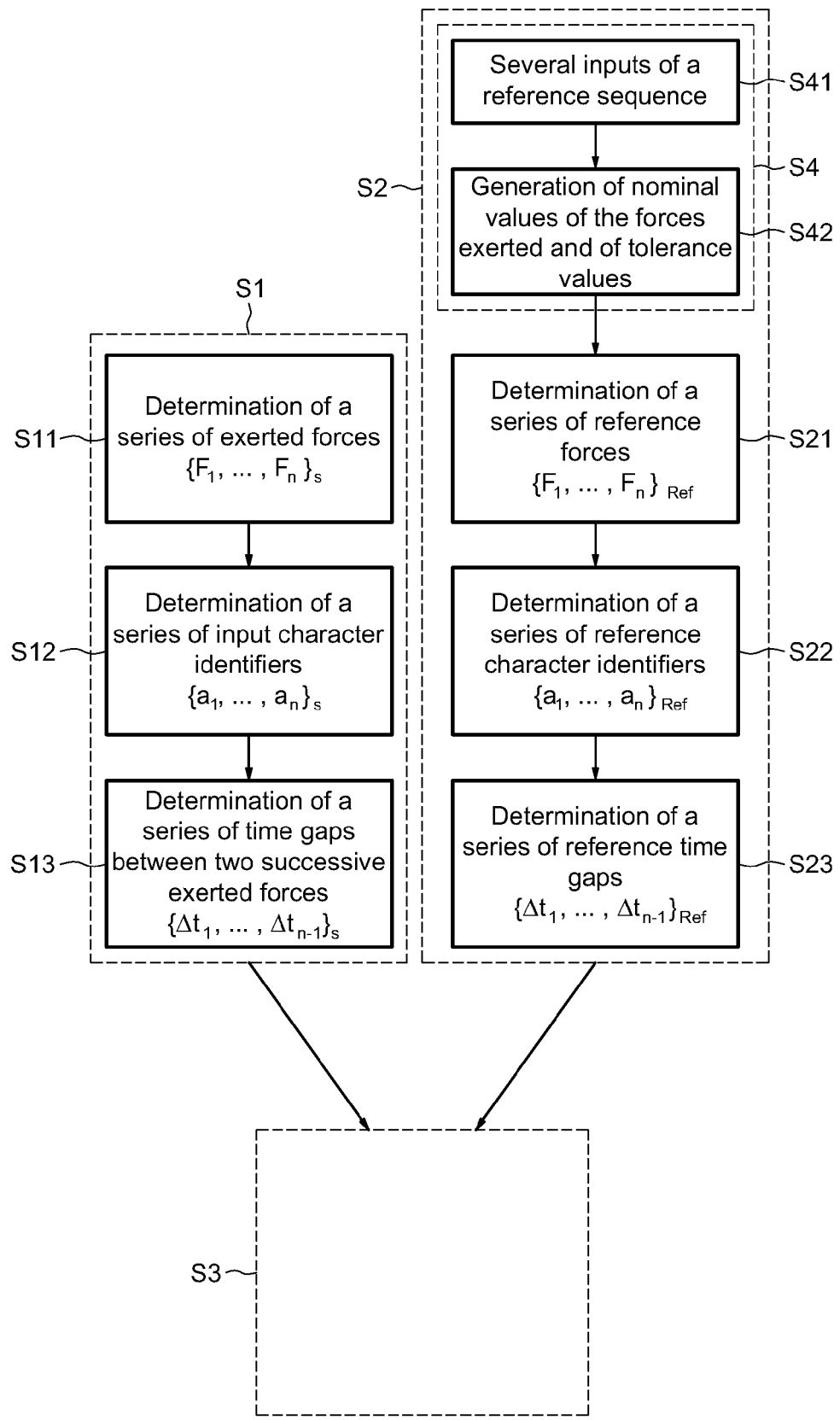
FIGS. 3a and 3b illustrate schematically the main phases of an authentication method.
Figure 3B:
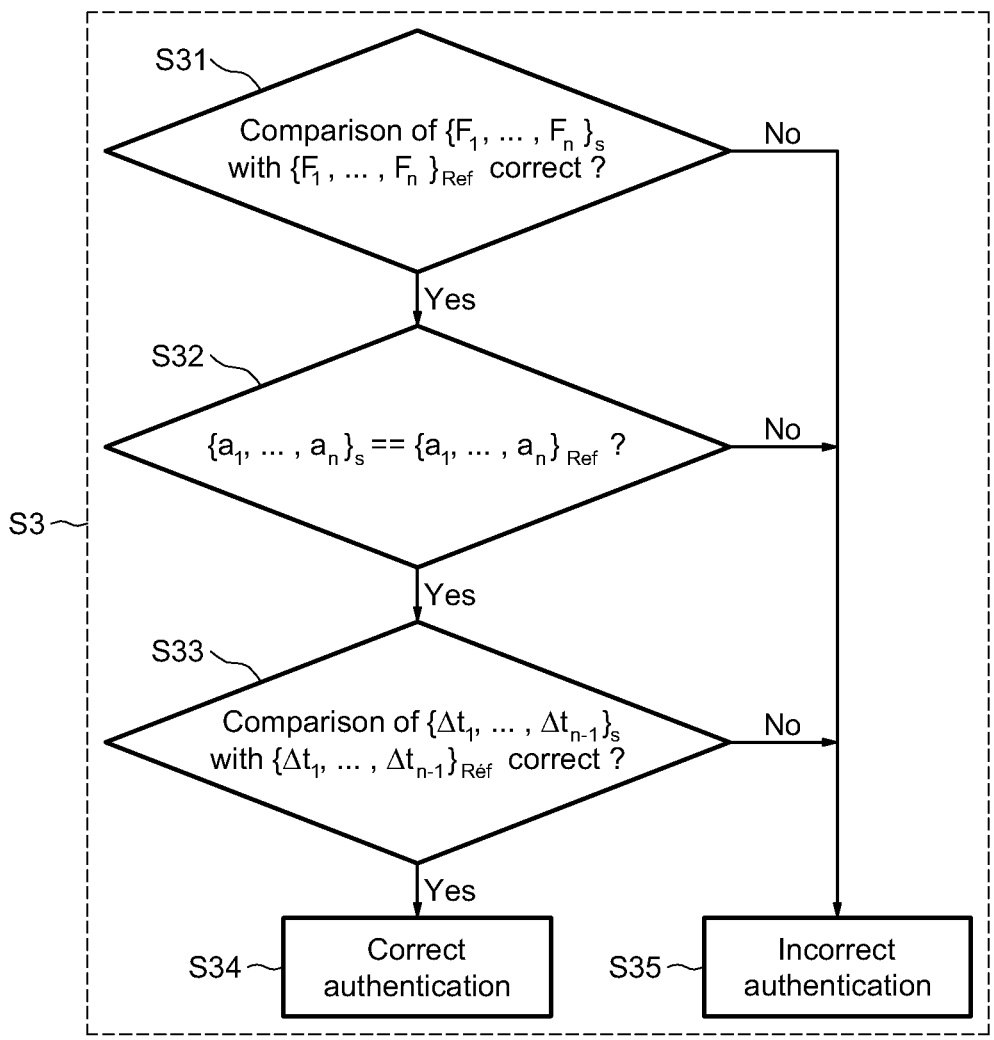

FIGS. 3a and 3b show the main steps of the authentication method. This method comprises a step S1 for the input of a sequence of characters, such as a password, by the user. During this inputting step S1, a step S11 is carried out for determining a series of forces exerted on the input device $\{F1, \ldots, Fn\}$s. When entering the sequence of characters, each force exerted on the input device 2 may comprise several components, respectively, according to several directional axes, for example three directional axes. Each component of a force exerted on the input device 2 corresponds to a force exerted along one directional axe. Thus, it is possible for determining several forces exerted respectively on several directional axes for each force exerted to the input device 2.

This inputting step S1 in this instance also comprises a determination S12 of a series of identifiers of input characters $\{a1, \ldots, an\}$s. This inputting step S1 may also comprise a determination S13 of a series of time gaps between two forces exerted successively $\{\Delta t1, \ldots, \Delta tn-1\}$ s.

The method for authenticating the user also comprises a step S2 in which reference series are determined for the purpose of comparing the series determined during the input of the character sequence with references.

The determination of a reference sequence S2 comprises a determination S21 of a series of reference forces $\{F1, \ldots, Fn\}$ref, and also in this example a determination S22 of a series of reference character identifiers $\{a1, \ldots, an\}$ref and a determination S23 of a series of reference time gaps $\{\Delta t1, \ldots, \Delta tn-1\}$ref.

The determination S22 of the series of reference character identifiers $\{a1, \ldots, an\}$ref comprises storing in memory of the series, that is to say recording a password.

In order to determine the series of reference forces, the authentication method may comprise a learning phase S4 comprising a first step S41 in which the user carries out several inputs of one and the same character sequence, and a second step S42 in which nominal values of the forces exerted and of the tolerance values are generated. The learning phase S4 can be carried out before any "operational" input by the user, or else for example during at least one of the first "operational" inputs by the user.

The generation S42 of the nominal values of the forces exerted and of the tolerance values can be carried out on the basis of a statistical test. This statistical test makes it possible to establish a force profile associated with the user. An example of a possible test is next described. According to this example of a test, it is possible to consider, for example, a 10-character password $\{a1, \ldots, a10\}$s. The user inputs these ten characters and, for each event, that is to say for each key pressed on the keypad, the value of an exerted force $F_{i,k}$ is measured in which i is an index representing the key pressed by the user and k an index representing the input made. According to another embodiment, for each pushed key 4 of the keypad 2, several values of several forces exerted are measured along respectively several directional axes, for example three directional axes. Thus, during a first input, the series of forces $\{F1,1; \ldots F10,1\}$s is obtained, during the second input, the second series of forces $\{F1,2; \ldots F10,2\}$s is obtained, during the kth input the kth series of forces $\{F1,k; \ldots F10,k\}$s is obtained.

It is then possible to combine these force values by producing the arithmetic mean in order to obtain reference values $\{F1, \ldots F10\}$ref. Moreover, the standard variation Di is computed for the force values $F_{i,k}$ obtained in order to obtain the nominal values $\{F1\pm D1, \ldots F10\pm D10\}$ref. This series of nominal values $\{F1\pm D1, \ldots F10\pm D10\}$ref is then recorded as a series of reference forces $\{F1, \ldots, F10\}$ref, where $F1=F1\pm D1, \ldots, F10=F10\pm D10$.

It is also possible to use a tolerance V that can be set for example at 5%, in order to characterize the inputs of the user. A series of reference forces is then determined corresponding to the next series of ranges $\{F1\pm(D1+V), \ldots F10\pm(D10+V)\}$ref.

It is possible to apply an identical statistical test in order to determine the series of reference time gaps $\{\Delta t1\pm(D1+Vt), \ldots, \Delta t9\pm(D9+Vt)\}$ref, in which the tolerance Vt can be equal to the tolerance V used for the previous reference series. One skilled in the art will recognize various statistical tests that could be employed to obtain the references values and further that the same statistical test may be, be need not necessarily be, employed to derive the series of reference forces and the series of reference time gaps.

As indicated above, in a first embodiment, the reference series can be stored in memory prior to the inputting of the character sequence ("operational" input). Then, in step S3, a comparison is made of the input series with the reference series in order to authenticate the user.

In another embodiment, the series of reference character identifiers $\{a1, \ldots, an\}$ref is stored in memory and the series of reference forces $\{F1, \ldots, Fn\}$ref and of reference time gaps $\{\Delta t1, \ldots, \Delta tn\ 1\}$ref is determined during at least one of the first, or from all, the "operational" inputs made by the user. Thus, it is possible to specify the nominal values of these two reference series throughout the use of the keypad by the individual so as to reinforce the authentication.

The comparison of sequences S3 comprises, in this example, three comparison steps S31 to S33, as shown in FIG. 3b. The first comparison step S31 makes it possible to compare the series of forces exerted on the input device $\{F1, \ldots, Fn\}$s with the series of reference forces $\{F1, \ldots, Fn\}$ref. If the comparison is correct, the second comparison step S32 is then carried out and if not, an error step S35 is carried out in which the authentication is declared incorrect.

"Correct identification" means that the force exerted $F_i$ during inputting is within the range determined on the basis of the statistical test. In other words, the measured exerted forces $\{F1, \ldots, Fn\}$s is compared with the reference forces $\{F1\pm$ (D1+V), . . . Fn±(Dn+V)}ref. If the values of the exerted forces Fi are in the range [Fi (Di+V), Fi+(Di+V)], the comparison is considered correct.

In the second comparison step S32, the series of input character identifiers {a1, . . . , an}s is compared with the series of reference character identifiers {a1, . . . , an}ref. During this step S32, if the series of input character identifiers is identical to the series of reference character identifiers, the third comparison step S33 is carried out and the error step S35 is carried out otherwise. This step makes it possible to reinforce the authentication.

During the third comparison step S33, the series of input time gaps {Δt1, . . . , Δtn−1}s is compared with the series of reference time gaps {Δt1, . . . , Δtn−1}ref. If the comparison is correct, a validity step S34 is carried out in which the authentication is declared correct and the error step S35 is carried out otherwise.

Naturally, the order of the second step S32 and third step S33 can be reversed. Further, the order of any of the first step S31, the second step S32, and the third step S33 can be conducted in any order.

What is claimed is:

1. An authentication method comprising:
    determining an input sequence of at least one character entered by a user on an input device,
    determining a reference sequence of at least one reference character; and
    comparing the input sequence with the reference sequence;
    wherein the step of determining the input sequence comprises:
        determining a series of at least one force exerted on the input device with an inertial accelerometer when the sequence is input, wherein the at least one force displaces both an input portion of the input device and the inertial accelerometer, and
        determining a series of at least one time gap between two successive forces exerted on the input device, the reference sequence also comprising a series of at least one reference time gap associated with the user;
    wherein the step of determining the reference sequence comprises determining a series of at least one reference force associated with the user,
    wherein the step of comparing comprises comparing the series of at least one force exerted on the input device with the series of at least one reference force; and
    wherein the step of comparing further comprises comparing the series of at least one time gap between two successive forces exerted on the input device with the series of at least one reference time gap.

2. The method according to claim 1, wherein:
    the step of determining the input sequence comprises determining a series of a plurality of forces exerted successively on the input device,
    the step of determining the reference sequence comprises determining a succession of a plurality of reference forces associated with the user, and
    the step of comparing comprises comparing said series of forces exerted on the input device with the said succession of reference forces.

3. The method according to claim 2, wherein the step of determining the said series of forces exerted on the input device comprises, for each force exerted on the input device, determining a plurality of forces exerted on respectively a plurality of directional axes, each force exerted on one directional axis corresponding to a component of the force exerted on the input device, and the succession of reference forces comprises a series of a plurality of reference forces associated with the directional axes.

4. The method according to claim 1, wherein the step of determining a series of at least one force exerted on the input device, and the step of determining a series of at least one reference force comprise at least one acceleration measurement with at least one electromechanical microsystem of the accelerometer type coupled with the input device.

5. The method according to claim 3, wherein each step of determining one force exerted on one directional axis, and each step of determining one reference force associated with said one directional axis, comprises one acceleration measurement on said one directional axis with at least one electromechanical microsystem of the accelerometer type coupled with the input device.

6. The method according to claim 1, wherein the step of determining the input sequence further comprises determining a series of at least one input character identifier, the reference sequence further comprising a series of at least one reference character identifier, and the step of comparing further comprises comparing the series of at least one input character identifier with the series of at least one reference character identifier.

7. The method according to claim 1, wherein the step of determining the reference sequence comprises a learning phase comprising a plurality of inputs of said reference sequence on said input device and determining said reference forces on the basis of the plurality of inputs of said reference sequence.

8. The method according to claim 7, wherein the learning phase further comprises generating nominal values of one or more reference forces, and tolerance values relative to these nominal values.

9. An authentication system comprising:
    an input device having a plurality of input elements configured for inputting respectively characters in response to an input by a user of a sequence of at least one character, wherein each of the plurality of input elements comprises at least one determination means to determine a force exerted on the at least one input element;
    recording means for recording a series of at least one force exerted on the at least one input element;
    recording means for recording a series of time gaps between two successive forces exerted in a same direction on the respective input elements;
    a memory configured for storing a series of at least one reference force and a series of at least one reference time gap associated with the user; and
    comparison means for comparing the series of at least one exerted force with the series of at least one reference force and for comparing the series of at least one reference time gap associated with the user with the two successive forces exerted in the same direction on the respective input elements.

10. The system according to claim 9, wherein the input device comprises a plurality of determination means coupled respectively to respective ones of the plurality of input elements, in order to determine a series of forces exerted on each of the ones of the plurality of input elements, the memory being further configured for storing a series of a plurality of reference forces and wherein the comparison means is configured for comparing the series of forces exerted on each of the ones of the plurality of input elements with the series of a plurality of reference forces.

11. The system according to claim 9, wherein the input device comprises a plurality of determination means coupled respectively to respective ones of the plurality of input elements, each determination means being configured for determining several forces exerted on respectively several directional axes, each force exerted on one directional axis corresponding to a component of the force exerted on the input element coupled to the determination means, the memory is configured for storing a series of several reference forces associated with these directional axes, and the comparison means is configured for comparing the series of forces exerted on each of the ones of the plurality of input elements with the series of a plurality of reference forces.

12. The system according to claim 11, wherein each determination means is configured for determining each force exerted on one directional axis, axe, and each reference force associated with said one directional axis, from one acceleration measurement on said one directional axis.

13. The system according to claim 9, wherein the input elements are respectively keys of a keypad.

14. The system according to claim 9, wherein at least one determination means is an electromechanical microsystem of the accelerometer type.

15. The system according to claim 9, wherein the recording means is configured for recording a series of at least one input character identifier, the memory is configured for storing a series of at least one reference character identifier, and the comparison means is configured for comparing the series of at least one input character identifier with the series of at least one reference character identifier.

16. An authentication method comprising:
receiving an indication of a user input on an input device;
receiving an indication of forces associated with the user input on the input device, the indication of the forces comprising indications of a plurality of forces, at least two of the plurality of forces being at right angles to each other, at least one of the at least two of the plurality of forces being in the same direction as a force from the user input;
determining a series of time gaps between successive indications of forces associated with the user input exerted by the user on the input device;
comparing with a processor the force associated with the user input on the input device with a reference force; and
comparing with the processor the series of time gaps between successive indications of forces exerted on the input device with a stored series of reference time gaps associated with the user.

17. The method of claim 16 wherein the user input is a key stroke and further comprising:
comparing the key stroke input by the user with a reference key stroke.

18. The method of claim 16, wherein the user input is a series of key strokes and further comprising:
comparing the series of key strokes input by the user with a reference series of key strokes.

19. The method of claim 18 further comprising:
receiving an indication of a force associated with each keystroke of the series of keystrokes; and
comparing the force associated with each keystroke of the series of keystrokes with a series of reference forces.

20. An authentication system comprising:
an input device configured to receive input representing a sequence of characters input by a user and to determine a series of forces exerted by the user when inputting the sequence of characters;
a recorder configured to record the series of forces and a series of time gaps between successive forces exerted in the same direction on the input device;
a memory configured to store a series of reference forces and a series of reference time gaps associated with the user; and
a comparator configured to compare the series of forces with the series of reference forces and to compare the series of time gaps with the series of reference time gaps.

21. The system according to claim 20, wherein the input device comprises a plurality of input elements.

22. The system according to claim 21, wherein the input device comprises a plurality of force detectors, each force detector coupled to a respective one of the input elements to determine the series of forces.

23. The system according to claim 22, wherein the force detectors are configured to determine a plurality of forces exerted on different directional axes, each force exerted on one directional axis corresponding to a component of the force exerted on the input element coupled to the force detector;
wherein the memory is configured to store a series of reference forces associated with the directional axes; and
wherein the comparator is configured to compare the series of forces exerted on each of the input elements with the series of reference forces associated with the directional axes.

24. The system according to claim 23, wherein each force detector is configured to determine each force exerted on one directional axis and each reference force associated with the one directional axis based upon an acceleration measurement on the one directional axis.

25. The system according to claim 21, wherein the input device is a keypad and wherein the input elements are keys of the keypad.

26. The system according to claim 20, wherein the input device comprises a plurality of force detectors to determine the series of forces exerted by the user when inputting the sequence of characters.

27. The system according to claim 26, wherein each force detector comprises a MEMS accelerometer.

28. The system according to claim 20, wherein the recorder is configured to record a series of input character identifiers, the memory is configured to store a series of reference character identifiers, and the comparator is configured to compare the series of input character identifiers with the series of reference character identifiers.

* * * * *

UNITED STATES PATENT AND TRADEMARK OFFICE
CERTIFICATE OF CORRECTION

| | |
|---|---|
| PATENT NO. | : 8,887,269 B2 |
| APPLICATION NO. | : 13/091332 |
| DATED | : November 11, 2014 |
| INVENTOR(S) | : Yannick Teglia |

It is certified that error appears in the above-identified patent and that said Letters Patent is hereby corrected as shown below:

In the Claims,

In Col. 11, line 17, claim 12, delete "axe,".

Signed and Sealed this
Tenth Day of March, 2015

Michelle K. Lee
*Deputy Director of the United States Patent and Trademark Office*